United States Patent [19]
Goward et al.

[11] 3,768,844
[45] Oct. 30, 1973

[54] END FITTINGS

[75] Inventors: Stanley Harold Goward; Michael Robert Goddard, both of London, England

[73] Assignee: BTR Industries Limited, London, England

[22] Filed: Feb. 4, 1972

[21] Appl. No.: 223,494

[52] U.S. Cl............................ 285/137 R, 285/305
[51] Int. Cl............................................. F16l 39/00
[58] Field of Search................ 285/137 R, 305, 136, 285/134; 137/375

[56] References Cited
UNITED STATES PATENTS

| | | | |
|---|---|---|---|
| 3,590,855 | 7/1971 | Woollen et al................... | 285/137 R |
| 3,527,485 | 9/1970 | Goward et al....................... | 285/305 |
| 3,333,598 | 8/1967 | Schott............................. | 285/137 R |
| 2,701,147 | 2/1955 | Summerville.................... | 285/137 R |
| 3,305,249 | 2/1967 | Zahuranec...................... | 285/137 R |

FOREIGN PATENTS OR APPLICATIONS

| | | | |
|---|---|---|---|
| 61,399 | 4/1968 | Germany........................ | 285/137 R |
| 648,266 | 10/1962 | Italy................................ | 285/137 R |
| 1,216,767 | 12/1970 | Great Britain.................. | 285/137 R |

*Primary Examiner*—Thomas F. Callaghan
*Attorney*—Watson, Cole, Grindle & Watson

[57] ABSTRACT

An end fitting for a device comprising a plurality of pipes located within an outer sheath, each of the pipes having a spigot and, comprising a plug member having a plurality of holes, one spigot end projecting through each of the holes. The plug member is insertable into a socket member having a plurality of holes for receiving the spigot ends and means are provided to hold the two members together. Each spigot end may be rotatable in the respective hole in the plug member.

6 Claims, 4 Drawing Figures

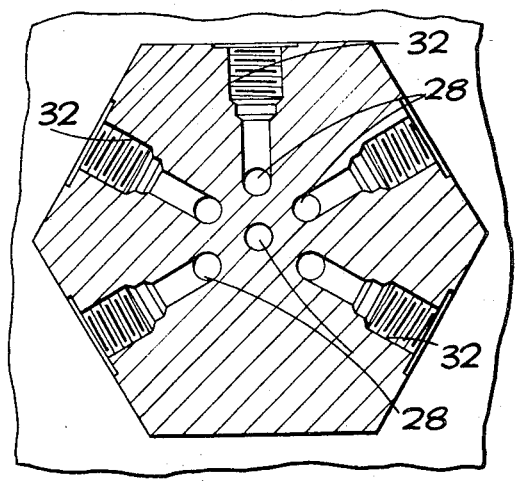
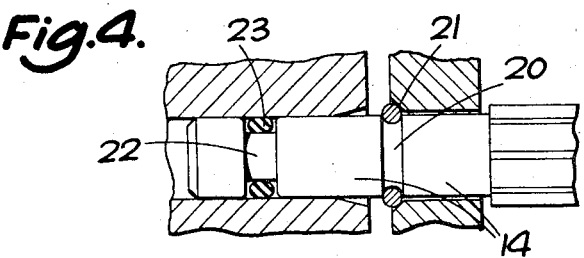
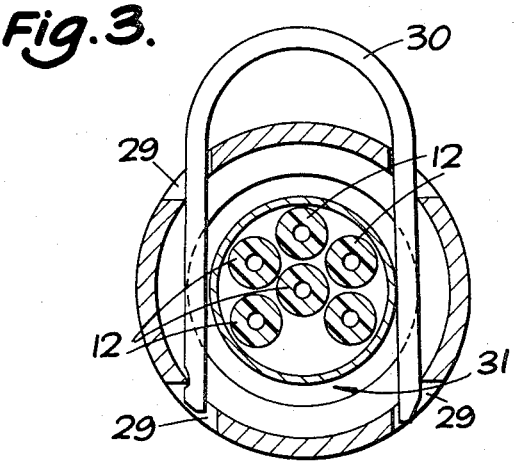

3,768,844

END FITTINGS

BACKGROUND OF THE INVENTION

The invention relates to end fittings for multi-pipe devices, which comprise a plurality of pipes located within a sheath.

It is known to have a plurality of pipes located within a sheath. It is an object of the invention to provide an end fitting for such a multi-pipe device in which each pipe of the device individually communicates with a duct provided in a socket member to which the end fitting can be attached, whilst allowing the device as a whole to be flexed without straining the ends of each pipe within the sheath.

BRIEF SUMMARY OF THE INVENTION

According to the invention, an end fitting for a multi-pipe device comprising a plurality of pipes located within a sheath each pipe having a spigot provided on the free end thereof, comprises, in combination, a plug member attachable to the free end of the sheath, a plurality of holes extending through the plug member and each being capable of receiving one spigot such that each spigot may project through a hole, a socket member, means to axially align the socket member and the plug member, the socket member having a plurality of holes each opposed to a hole in said end face and capable of receiving a spigot when the two members are aligned, and means to hold the two members together.

The invention also provides an end fitting according to the above described arrangement in combination with an end portion of a multi-pipe device comprising a plurality of pipes located within a sheath each pipe having a spigot provided on the free end thereof.

Locking means may be provided to retain each spigot in the hole through which it projects.

In the last described arrangement, the locking means may permit relative rotation between a locked spigot and the plug member.

Sealing means may be provided on each spigot such that when the plug member and the socket member are held together each spigot makes fluid-tight engagement with an aligned hole in the socket member.

The means for holding the two members together may be releasable, and may comprise a U-shaped clip insertable into at least two apertures provided in the socket member, and engageable with a groove provided in the plug member.

Each hole in the socket member may terminate in a threaded bore communicating with an outer wall of the socket member.

BRIEF DESCRIPTION OF THE DRAWINGS

FIG. 2 is a section on line A—A on FIG. 1;

FIG. 3 is a section on line B—B on FIG. 1; and

FIG. 4 is an enlarged view of part of FIG. 1.

DESCRIPTION OF THE PREFERRED EMBODIMENT

Figure 1:
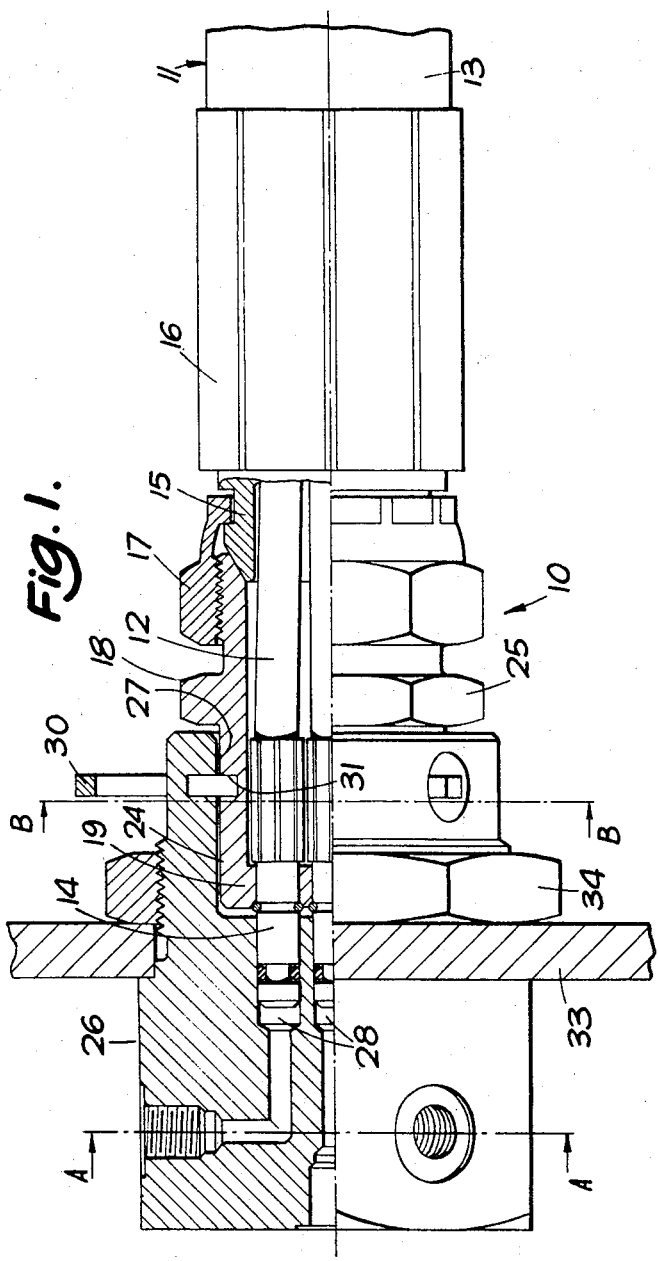
FIG. 1 is a part-sectional view of one specific embodiment of end fitting constructed in accordance with the invention.

The end fitting 10 illustrated in the drawings is shown attached to the free end of a conduited flexible multi-pipe cable 11 comprising six flexible hoses 12 located within a flexible wire reinforced sheath 13. The free end of each hose 12 is provided with a spigot 14. Each spigot 14 may be attached to the respective hose, for example, by means of a crimped ferrule, which compresses the hose body on to a part of the spigot which has been inserted into the bore of the hose.

A tubular member 15 is inserted into the free end of the sheath 13, and a ferrule 16 is crimped on to the sheath to compress the sheath body into engagement with the tubular member 15. A nut 17 is rotatably mounted on the tubular member 15 and is engaged with corresponding threads provided on a plug member 18. The plug member 18 has an end face 19 which has six holes extending therethrough, a spigot 14 projecting through each hole.

Each spigot 14 has a groove 20 formed in its outer surface adjacent the outer side of the end face of the spigot, in which groove 20 a circlip 21 is located. The circlip prevents withdrawal of the spigot on which it is fitted through the associated hole, but permits relative rotation between the spigot and the plug member 18. (FIG. 4).

Each spigot 14 has a further groove 22 adjacent the free end thereof, in which an 'O'-ring seal 23 is located, for a purpose described below.

The plug member 18 has a cylindrical outer surface 24 co-axial with the axis of the tubular member, and is provided with a hexagonal portion 25 by which it may be held against rotation when the nut 17 is tightened on the threaded portions.

The plug member is insertable within a socket member 26, provided with a cylindrical bore 27 in which the outer surface 24 may be received. The socket member has six holes 28 formed therein each aligned with a hole in the plug member such that as the plug member is inserted into the socket member each spigot enters an aligned hole in the socket member.

The wall of the cylindrical bore 27 is provided with four apertures 29 into which a U-shaped clip 30 may be inserted. A groove 31 is provided in the cylindrical outer surface 24 of the plug member, such that the arms of the clip 30 engage the walls of the groove and resist withdrawal of the plug member from the socket member (FIG. 3).

Each hole 28 terminates in a threaded bore 32 which communicates with an outer wall of the scoket member, and a conventional threaded connector (not shown) may be screwed into the bores 32.

The socket member is shown inserted through a hole provided in a plate 33, a nut 34 being engaged with threads on the socket member to hold the socket member in position. However, any other convenient means may be employed to hold the socket member.

In use, the circlips 21 permit relative rotation between any of the spigots (and hence the hoses to which they are attached) and the plug member 18, while preventing withdrawal of the spigots through the holes in the plug member. Such relative rotation may be caused, for example, by cabling the multi-pipe within sheath 13.

The 'O'-ring seals 23 on the spigots make a fluid-tight connection between the spigots and the holes provided in the socket member.

In an alternative arrangement (not shown) the plug member is provided with a tubular portion insertable directly into the sheath, and a ferrule is crimped on to the body of the sheath to hold the sheath and the tubular portion together.

A similar connector to either of the above described arrangements may be used at the other end (not shown) of the multi-shape cable 11.

An advantage of the end fitting is that each hose 12 is allowed to rotate with respect to the plug member 18. There is a tendency for such rotation to occur during flexing of the sheath, or when a length of the multi-pipe cable 11 is being wound on a drum or the like.

We claim:
1. A hose assembly comprising:
   a. a multi-pipe hose having a plurality of flexible pipes located within a flexible sheath;
   b. a tubular end fitting anchored to and projecting axially from one end of the sheath;
   c. a plug member rotatably mounted at the free end of the tubular end fitting, the plug member having a plurality of holes extending therethrough;
   d. an external threaded portion provided on the plug member;
   e. a union nut located on the end fitting and engageable with said threaded portion on said plug member to lock the plug member to the end fitting against relative rotation;
   f. a plurality of spigots attached to the ends of the pipes adjacent the plug member respectively to form extensions of the pipes, each spigot being engageable in a respective hole in the plug member and, when so engaged, being free to rotate with respect to the plug member;
   g. a socket member;
   h. means to axially align the socket member and the plug member;
   i. a plurality of holes in the socket member, each hole in the socket member being opposed to a hole in the plug member and receiving a spigot when said two members are aligned; and
   j. means to hold the two members together.

2. An assembly as claimed in claim 1 in which sealing means are provided on each spigot such that when the plug member and the socket member are held together each spigot makes fluid-tight engagement with an aligned hole in the socket member.

3. An assembly as claimed in claim 1 in which the means for holding the two members together is releasable.

4. An assembly as claimed in claim 3 in which the holding means comprises a U-shaped clip insertable into at least two apertures provided in the socket member, and engageable with a groove provided in the plug member.

5. An assembly as claimed in claim 1 in which each hole in the socket member terminates in a threaded bore communicating with an outer wall of the socket member.

6. An assembly as claimed in claim 1 wherein means are provided for retaining the spigots in said holes in the plug member, which retaining means permit relative rotation between each of the spigots and the plug member.

* * * * *